(12) United States Patent
Hino et al.

(10) Patent No.: US 6,226,460 B1
(45) Date of Patent: May 1, 2001

(54) MOVABLE FILTER DEVICE

(75) Inventors: Masayuki Hino; Takaaki Tomita, both of Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/506,321

(22) Filed: Feb. 18, 2000

(30) Foreign Application Priority Data

Feb. 19, 1999 (JP) ................................................. 11-041182

(51) Int. Cl.[7] ........................................................ G03B 71/00

(52) U.S. Cl. .............................. 396/73; 396/355; 396/544

(58) Field of Search ................................. 396/73, 71, 355, 396/380, 381, 429, 435, 530, 544, 439

(56) References Cited

U.S. PATENT DOCUMENTS 4,681,418 * 7/1987 Kodaira .................................. 396/544
5,079,576 * 1/1992 Kodaira .................................. 396/544

* cited by examiner

*Primary Examiner*—David M. Gray
(74) *Attorney, Agent, or Firm*—Wenderoth, Lind & Ponack, L.L.P.

(57) ABSTRACT

A movable filter device comprises a rotary plate for holding an optical filter, a holding plate for holding the rotary plate rotatably at a pivot point, stopper pins, and a torsion coil spring. The torsion coil spring has one end coupled to the holding plate and the other end coupled to the rotary plate, and generates a force for extending both ends thereof. The force generated by the torsion coil spring prevents the rotary plate from stopping at positions other than those defined by the stopper pins. The rotary plate has slender portions of low rigidity for absorbing the impact of collision between the rotary plate and stopper pins.

8 Claims, 5 Drawing Sheets

MOVABLE FILTER DEVICE

FIELD OF THE INVENTION

The present invention relates to a movable optical filter device in a video camera or the like.

CONVENTIONAL ART

FIG. 5 shows a conventional movable filter device. A rotary disk 102 holds a plurality of optical filters 101a to 101d. As the optical filters 101a to 101d, generally, ND filters (neutral density filters) and color temperature conversion filters are used. A roller 107a held by an elastic arm 107b is always pressing the rotary disk 102. By turning a rotary knob 106, rotation is transmitted to the rotary disk 102 through gears 105a to 105c. As the rotary disk 102 rotates, when the roller 107a gets into a dent 102e of the rotary disk 102, the rotary disk 102 is held in that position by the pressure from the roller 107a. In this state, the optical axis z of the camera and the center of the optical filter 101a a coincide. By thus turning the rotary knob 106, a desired filter can be set on the optical axis z of the camera. In such conventional movable filter device, if the rotary knob 106 was turned too much, the roller 107a surpassed the dent 102e, thereby causing overshoot. To prevent overshoot, on the other hand, if the dent 102e was too deep, the rotary load increased, and the operation was not smooth. In spite of the advantage that a plurality of optical filters can be selected, the device is large in size, many in the number of parts, and hence expensive. The invention is devised to solve these problems, and it is hence an object thereof to present a movable filter device capable of preventing the optical filter from stopping at other than a specified position, and which is small in size, low in cost, and smooth in operation.

SUMMARY OF THE INVENTION

In the movable filter device of the invention, one rotary member holds one optical filter. In order to use a plurality of optical filters alone or in combination, if necessary, a plurality of rotary members are overlaid so as to move them individually. The rotary member is rotatably supported at point (P) on a holding member. Two stopper pins limit the rotation of the rotary member between a first position and a second position. The optical filter is set on the optical axis of the camera when the rotary member is at the first position. One end of an elastic member is rotatably coupled to point (2c) in the rotary member, and the other end of the elastic member is rotatably coupled to a point (3c) in the holding member. The position ofpoint (3c) is preferably at a remote position over the rotary member as seen from point (P). The position of point (2c) is preferably so that the line linking point (P) and point (3c) may intersect with the track of point (2c), within the limitations of the rotation, and that the distance between point (3c) and point (2c) may be smaller than the distance between point (P) and point (2c). The elastic member generates force in a direction of extending the distance between point (2c) and point (3c), and the rotary member is thrust toward the first position or the second position by the force generated by the elastic member, which is because the distance between point (2c) and point (3c) is extended to its longest when the rotary member is located at the first position or the second position. The thrusting force by the elastic member prevents the optical filter from stopping at other than the first position or the second position, and also improves the feel of manipulation of the variable filter device. In the movable filter device of the invention, when the rotary member abuts against the stopper pin, the low rigidity portion provided in the rotary member is elastically deformed, and absorbs the impact. As a result, the sound in manipulation is suppressed, and the feel of manipulation is improved.

DETAILED DESCRIPTION OF THE INVENTION

Embodiment 1

Figure 1:
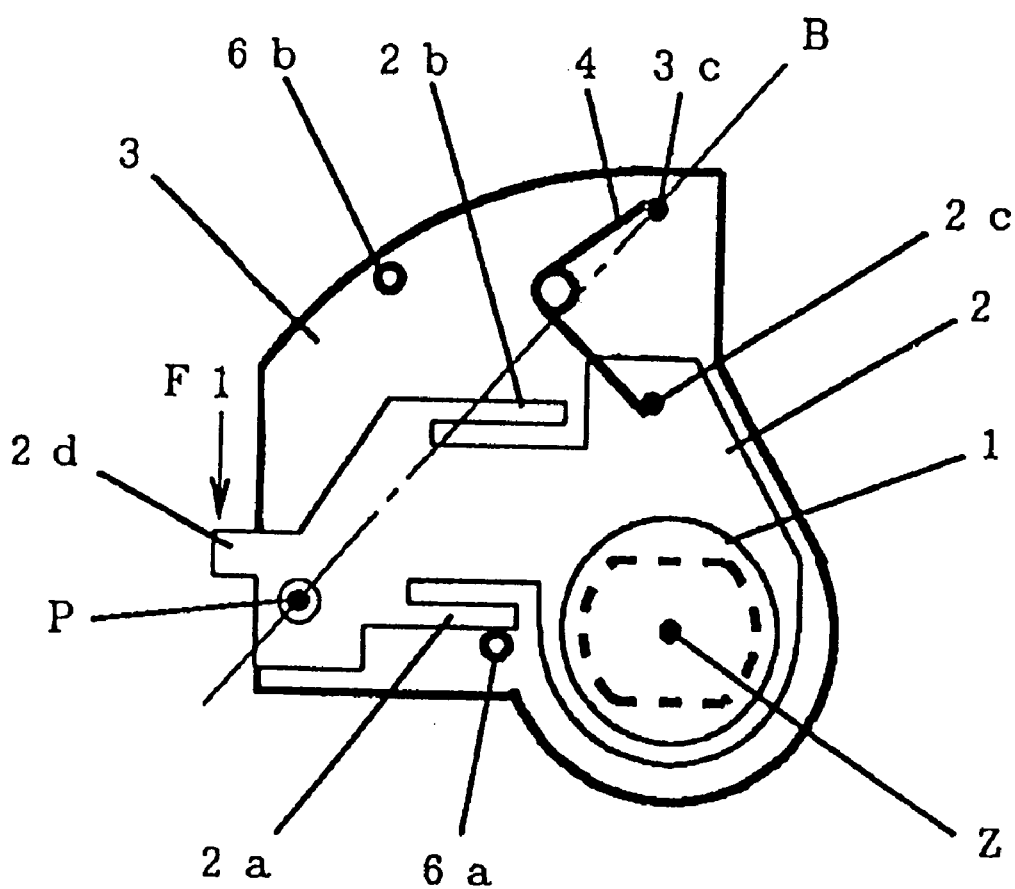
FIG. 1 is a front view of a movable filter device of a first embodiment of the invention. A rotary member is at a first position, and an optical filter is set on the optical axis of a camera. The rotary member contacts with a stopper in a slender portion of low rigidity.
Figure 2:
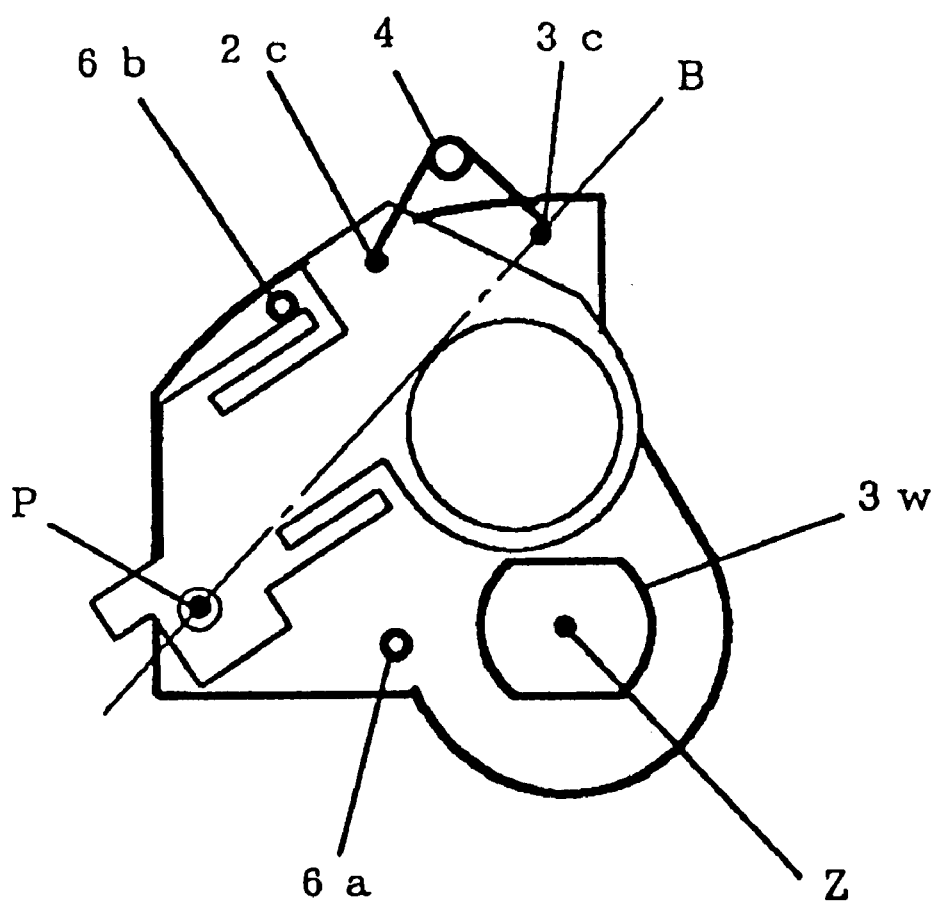
FIG. 2 is a front view of the movable filter device of the first embodiment of the invention. The rotary member is at a second position. The rotary member contacts with the stopper in the slender portion of low rigidity.
Figure 3:
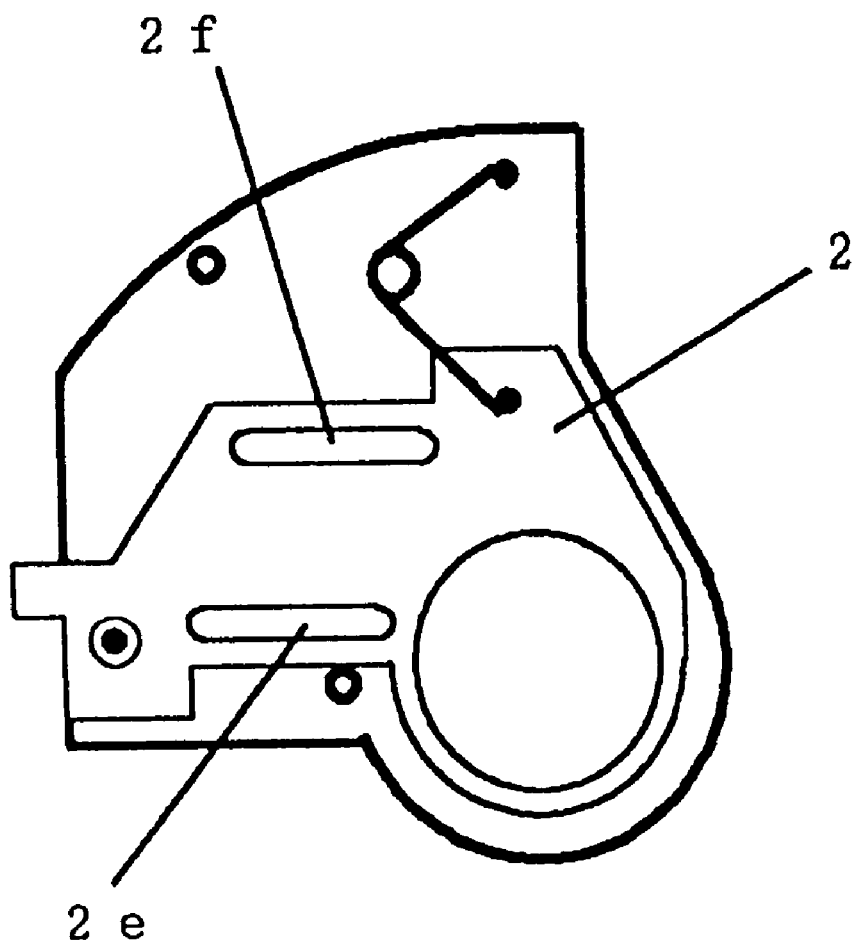
FIG. 3 is a front view of the movable filter device of the first embodiment of the invention. The rotary member contacts with the stopper in the slender portion of low rigidity, which is formed by a slot.

A first embodiment of the invention is described below while referring to FIG. 1 to FIG. 3. FIG. 1 and FIG. 2 are front views of the movable filter device of the first embodiment of the invention. As shown in FIG. 1 and FIG. 2, the movable filter device of the invention comprises an ND filter 1 as an optical filter, a rotary plate 2 as a rotary member for fixing the ND filter 1, a holding plate 3 as a holding member for holding the rotary plate 2 rotatably at point (P) in the holding member, stopper pins 6a and 6b fixed on the holding plate 3, and a torsion coil spring 4 as an elastic member.

The stopper pins 6a and 6b limit the rotation of the rotary plate 2 between a first position shown in FIG. 1 and a second position shown in FIG. 2. As shown in FIG. 1, the stopper pin 6a fixes the rotary plate 2 at the first position. The ND filter 1 is set on the optical axis of the camera when the rotary plate 2 is at the first position. As shown in FIG. 2, the stopper pin 6b stops the rotary plate 2 at the second position.

The thickness of the ND filter 1 is sufficiently thin so that the optical length of the entire camera may be hardly changed. The holding plate 3 is fixed on the video camera so that the optical axis Z of the camera may pass vertically through the center of a window 3w. The torsion coil spring 4 is rotatably coupled, with one end at point (3c) in the holding plate 3 and other end at point (2c) in the rotary plate 2. The position of point (3c) is preferably at a remote position over the rotary member as seen from point (P). The position of point (2c) is preferably so that the line linking point (P) and point (3c) may intersect with the track of point (2c), within the limitations of the rotation, and that the distance between point (3c) and point (2c) may be smaller than the distance between point (P) and point (2c). The torsion coil spring 4 generates a force in the direction of extending the distance between point (3c) and point (2c) in this state. Therefore, the torsion coil spring 4 works to turn the rotary plate 2 in each direction of stopper pins 6a and 6b from the boundary of border line B linking point (P) and point (3c).

A rotary knob 2d is formed in the rotary plate 2, and slender portions 2a, 2b of low rigidity along the outer circumference are disposed in the portions abutting against the stopper pins 6a, 6b. FIG. 1 shows a state of setting the ND filter 1 on the optical axis Z of the camera. From the state in FIG. 1, consequently, when the rotary knob 2d of the rotary plate 2 is turned with a force in the direction of arrow F1, the rotary plate 2 turns in a direction of departing from the stopper pin 6a. At this time, the distance between both ends of the torsion coil spring 4 becomes shorter, and a large force against rotation is applied. When the force applied to the rotary knob 2b is small, the rotary plate 2 is pushed back to the original position by the force of the torsion coil spring 4. But when the applied force is sufficiently large, point (2c) surpasses the border line B, and thereafter the force generated by the torsion coil spring 4 thrusts the rotary plate 2 toward the stopper pin 6b, and, as a result, the rotary plate 2 abuts against the stopper pin 6b and stops as shown in FIG. 2, so that the ND filter 1 is removed from the optical axis Z of the camera. In this manner, from the boundary of the border line B, the torsion coil spring 4 acts to rotate the rotary plate 2 always in the direction of either the stopper pin 6a or 6b, so that the rotary plate 2 is prevented from stopping at positions other than those defined by the stopper pins 6a and 6b.

By contrast, hitherto, instead of the torsion coil spring 4, it was attempted to obtain similar effects by disposing an elastic member near point (P) in the center of rotation, but a large elasticity of the elastic member was required because the location was near the center of rotation. By contact or sliding with a large force, the reliability of durability is low, and to overcome it, the use of strong metal material or a rigid structure is essential, and the device becomes larger and heavier. In the movable filter device of the invention, since the torsion coil spring 4 is disposed at a position remote from point (P) in the center of rotation, the elastic force of the torsion coil spring 4 may be relatively small, and hence a stable operation is realized while maintaining a high reliability of durability.

The operation of the slender portions 2a, 2b of low rigidity is described below. When the rotary plate 2 abuts against the stopper pin, sound is generated by impact. In particular, when the movable filter device is built in a video camera or the like, the casing of the video camera main body acts to amplify the sound. Since the video camera is usually used by mounting its main body on a shoulder, a large sound is generated near the ear of the technician, and the feel of manipulation is poor. By contrast, in the movable filter device of the invention, when the rotary plate 2 abuts against the stopper pin, the slender portions 2a, 2b of low rigidity disposed in the rotary plate 2 are elastically deformed to absorb the impact. As a result, the sound during manipulation is decreased, and the feel of manipulation is improved. Hitherto, as the method of absorbing the impact at the time of abutting, an impact absorbing member was attached to the rotary plate 2, but in the invention, by disposing the slender portions 2a, 2b of low rigidity, such member is not necessary, so that the number of parts is reduced. Incidentally, the slender portions of low rigidity of the rotary plate 2 may also be obtained by forming slots 2e, 2f as shown in FIG. 3.

Embodiment 2

Figure 4:
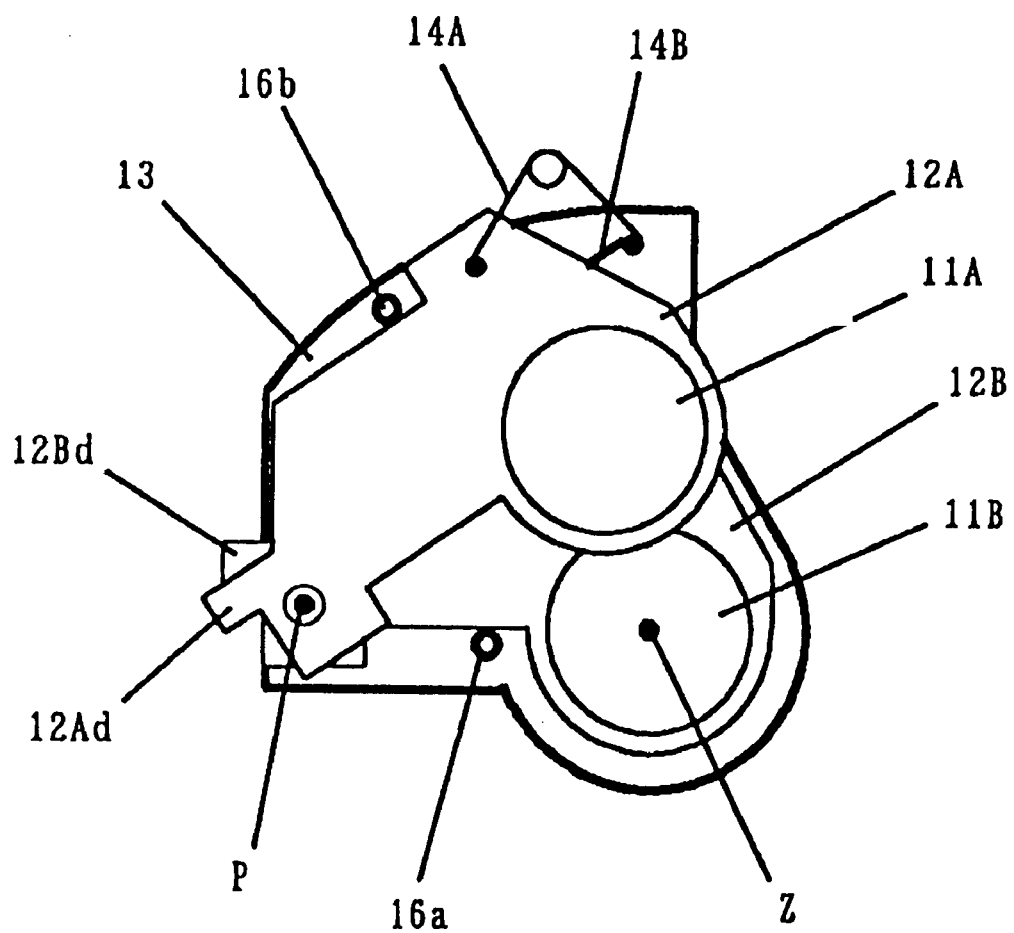
FIG. 4 is a front view of a movable filter device of a second embodiment of the invention. A plurality of rotary members are stacked up.
Figure 5:
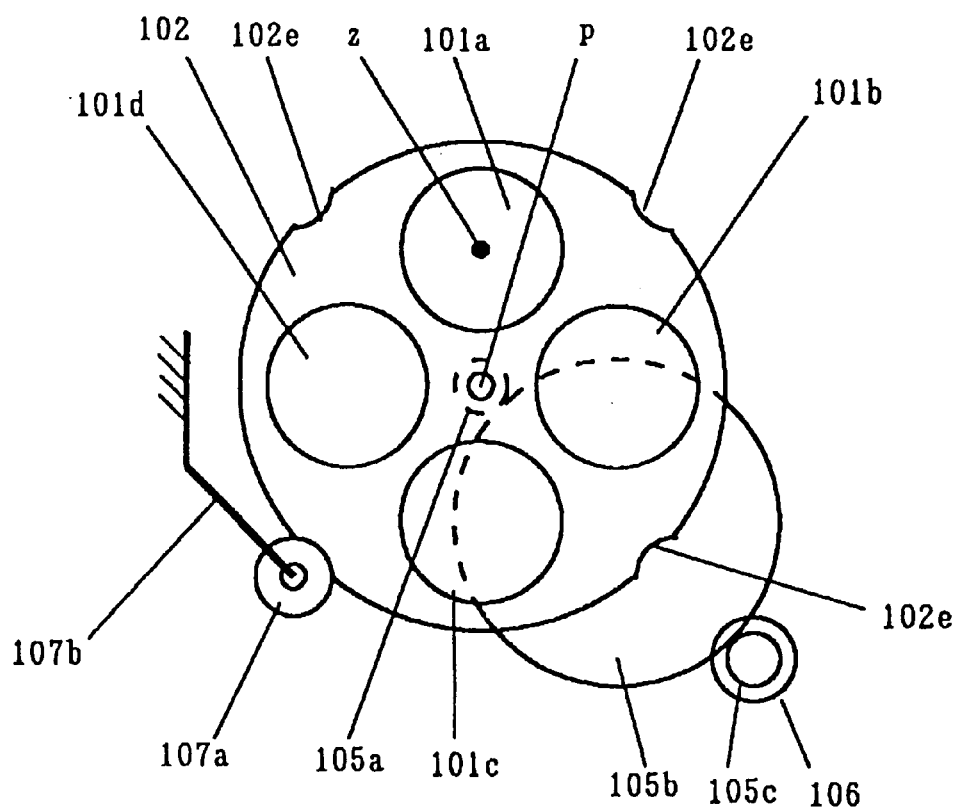
FIG. 5 is a front view of a conventional movable filter device.

FIG. 4 is a front view of a movable filter device in a second embodiment of the invention. As shown in FIG. 4, the movable filter device of the second embodiment of the invention comprises a rotary plate 12A fixing an ND filter 11A, a rotary plate 12B fixing an ND filter 11B different in kind from the ND filter 11A, a holding plate 13 for rotatably holding the rotary plates 12A, 12B at the same point (P), stopper pins 16a and 16b fixed to the holding plate 13, and torsion coil springs 14A, 14B. The ND filter 11A dims the light to ¼, and the ND filter 11B dims the light to ¹⁄₁₆. The thickness of the ND filters 11A, 11B is sufficiently thin so as not to change the optical length of the entire camera practically.

In the same manner as in the first embodiment, the torsion coil spring 14A is rotatably coupled, with one end at the holding plate 13 and other end at the rotary plate 12A, and the torsion coil spring 14B is rotatably coupled, with one end at the holding plate 13 and other end at the rotary plate 12B. The torsion coil springs 14A, 14B, in the coupled state, generate a force for extending both ends thereof In the rotary plates 12A, 12B, rotary knobs 12Ad, 12Bd are formed, respectively.

In FIG. 4, by setting the ND filter 11B and removing the ND filter 11A, the light is dimmed to ¹⁄₁₆. In this state, a force is applied to the rotary knob 12Ad, and the rotary plate 12A is turned and the ND filter 11A is overlaid and set, so that the light is dimmed to ¹⁄₆₄. Next, when the ND filter 11B is removed by the rotary knob 12Bd, the light is dimmed to ¼. Of course, it is possible to remove the ND filters 11A and 11B simultaneously.

Thus, according to the second embodiment of the invention, by overlaying and disposing a plurality of rotary plates that can be moved individually, and setting the ND filters selectively on the optical axis Z, a dimming rate corresponding to the combination of the ND filters can be obtained. The foregoing description does not refer to the material of the rotary plate and holding plate, but in consideration of the reduction of size, reduction of weight, and curtailment of the number of parts, by using a resin, when the stopper pins are formed together with the holding plate in an integrated form, the effects are outstanding. In the explanation so far, the optical filter is an ND filter, but is not limited to this, and the same effects are obtained by using color temperature conversion filter or others.

EFFECTS OF THE INVENTION

Thus, according to the invention, by preventing the optical filter from stopping at other than specified positions, and lowering the sound level during manipulation, a movable filter device of a favorable feel of manipulation and a small number of parts is realized.

What is claimed is:

1. A movable filter device to be incorporated in a camera, comprising:

a rotary member for holding an optical filter;

a holding member for supporting said rotary member rotatably about a pivot point;

at least one stopper for abutting against said rotary member for limiting rotation of said rotary member between a first position in which said rotary member is adapted to be set so that the optical filter is positioned on the optical axis of the camera, and a second position; and an elastic member having a first end coupled to said rotary member at a first point, and a second end coupled to said holding member at a second point;

wherein the positions of said second point and said first point are determined so that a line linking said pivot point and said second point may intersect with the track of said first point within limitations of the rotation, said elastic member generates a force in a direction of extending the distance between said first point and said second point, and said rotary member is thrust by the force generated by the elastic member toward said first position or said section position; and wherein said rotary member includes at least one elastically deformable low-rigidity portion positioned such that, when said at least one stopper abuts against said rotary member, said at least one stopper abuts against said at least one elastically deformable low-rigidity portion so that impact between said rotary member and said at least one stopper is absorbed by elastic deformation of said at least one elastically deformable low-rigidity portion.

2. The movable filter device of claim 1, wherein said at least one stopper comprises first and second stoppers; and wherein said at least one elastically defomable low-rigidity portion comprises first and second elastically deformable low-rigidity portions respectively arranged for abutment with said first and second stoppers.

3. The movable filter device of claim 1, wherein said at least one elastically deformable low-rigidity portion comprises a slender portion on an outer circumference of said rotary member.

4. The moveable filter device of claim 1, wherein said at least one elastically deformable low-rigidity portion is formed by a slot along an outer circumference of said rotary member.

5. The movable filter device of claim 1, wherein a plurality of rotary members are stacked up so that a plurality of optical filters held by said rotary members may be used either alone or in combination.

6. The movable filter device of claim 1, wherein said rotary member includes a main body portion and said at least one elastically deformable low-rigidity portion; and wherein said at least one elastically deformable low-rigidity portion comprises a slender portion spaced from said main body portion.

7. The movable filter device of claim 1, wherein said slender portion has a first end connected to said main body portion, and a second end spaced apart from said main body portion.

8. The movable filter device of claim 1, wherein said slender portion has a first end connected to said main body portion, and a second end connected to said main body portion.

* * * * *